United States Patent
Kuwahara

(10) Patent No.: US 11,466,183 B2
(45) Date of Patent: Oct. 11, 2022

(54) ADHESIVE COMPOSITION, CURED PRODUCT, AND BONDED BODY

(71) Applicant: THREEBOND CO., LTD., Tokyo (JP)

(72) Inventor: Yusuke Kuwahara, Tokyo (JP)

(73) Assignee: THREEBOND CO., LID., Tokyo (JP)

( * ) Notice: Subject to any disclaimer, the term of this patent is extended or adjusted under 35 U.S.C. 154(b) by 588 days.

(21) Appl. No.: 16/442,981

(22) Filed: Jun. 17, 2019

(65) Prior Publication Data

US 2020/0024493 A1  Jan. 23, 2020

(30) Foreign Application Priority Data

Jul. 18, 2018 (JP) .............................. JP2018-134826

(51) Int. Cl.
| | | |
|---|---|---|
| *C09J 133/10* | (2006.01) | |
| *C09J 153/00* | (2006.01) | |
| C08K 5/14 | (2006.01) | |
| C09J 133/06 | (2006.01) | |
| C09J 187/00 | (2006.01) | |
| C08F 299/02 | (2006.01) | |
| C08F 297/02 | (2006.01) | |
| C08F 299/04 | (2006.01) | |
| C08F 301/00 | (2006.01) | |

(52) U.S. Cl.
CPC ......... *C09J 133/10* (2013.01); *C09J 153/005* (2013.01); *B32B 2457/202* (2013.01); *B32B 2457/206* (2013.01); *C08F 297/026* (2013.01); *C08F 299/024* (2013.01); *C08F 299/0492* (2013.01); *C08F 301/00* (2013.01); *C08K 5/14* (2013.01); *C09J 133/066* (2013.01); *C09J 133/068* (2013.01); *C09J 153/00* (2013.01); *C09J 187/00* (2013.01); *C09J 187/005* (2013.01); *C09J 2203/00* (2013.01); *C09J 2433/005* (2013.01); *C09J 2453/005* (2013.01); *C09K 2323/05* (2020.08); *C09K 2323/057* (2020.08); *C09K 2323/059* (2020.08)

(58) Field of Classification Search
CPC ......... B32B 2457/202; B32B 2457/206; C08F 287/00; C08F 297/026; C08F 299/024; C08F 299/0492; C08F 301/00; C08K 5/14; C09J 4/06; C09J 133/066; C09J 133/068; C09J 133/10; C09J 153/00; C09J 153/005; C09J 187/00; C09J 187/005; C09J 2203/00; C09J 2433/005; C09J 2453/005; C09K 2323/05; C09K 2323/057; C09K 2323/059

See application file for complete search history.

(56) References Cited

U.S. PATENT DOCUMENTS

| | | | | |
|---|---|---|---|---|
| 2004/0097658 A1* | 5/2004 | Everaerts | ............ | C08F 297/026 525/244 |
| 2006/0024521 A1* | 2/2006 | Everaerts | ............... | C09J 153/00 428/522 |
| 2009/0136774 A1* | 5/2009 | Onogi | ..................... | C08L 69/00 428/516 |
| 2011/0269894 A1* | 11/2011 | Miyamoto | ................ | C08F 2/24 524/533 |
| 2012/0070660 A1* | 3/2012 | Miyazaki | .............. | C08F 287/00 524/505 |
| 2016/0298005 A1* | 10/2016 | Sherman | ........... | C08F 220/1808 |

FOREIGN PATENT DOCUMENTS

| | | | |
|---|---|---|---|
| CN | 102574962 A | | 7/2012 |
| JP | 2013-134329 A | | 7/2013 |
| JP | 2013134329 A | * | 7/2013 |
| JP | 2014-009339 A | | 1/2014 |
| JP | 2017-036368 A | | 2/2017 |
| JP | 2017036368 A | * | 2/2017 |

OTHER PUBLICATIONS

Extended European search report dated Dec. 9, 2019, in corresponding European application No. 19184491.9; 7 pages.
Office Action dated Jun. 8, 2022 in corresponding Chinese Application No. 201910650058.3; 17 pages including English-language translation.

* cited by examiner

*Primary Examiner* — Eli D. Strah

(74) *Attorney, Agent, or Firm* — Maier & Maier, PLLC

(57) ABSTRACT

An adhesive composition which is excellent in adhesion to various hardly adhesive materials such as polyethylene terephthalate, polyethylene, polypropylene, modified polyphenylene ether, polyphenylene sulfide, and a cycloolefin polymer. Further, an adhesive composition containing the following components (A) to (C) may be described Component (A): (Meth) acrylic triblock elastomer having a weight average molecular weight of 80,000 or more, Component (B): (Meth) acrylate monomer having no hydroxyl group and having a phenoxy group, and Component (C): Radical initiator.

13 Claims, No Drawings

ADHESIVE COMPOSITION, CURED PRODUCT, AND BONDED BODY

FIELD

The present invention relates to an adhesive composition, a cured product, and a bonded body and a cured product using the same.

BACKGROUND

Conventionally, radical curable adhesives mainly composed of (meth) acrylate can be cured by various curing methods such as photo curing, heat curing, anaerobic curing, two-pack type curing, and the like and are used in a wide range of fields such as automobiles and transportation machine fields, electric and electronic parts, aircraft, building materials, sporting goods, civil engineering, packaging, and medical care, and the like. However, conventional radical curable adhesives are difficult to bond some hardly adhesive materials such as polyethylene terephthalate (PET), polyethylene (PE), polypropylene (PP), modified polyphenylene ether (PPE), polyphenylene sulfide (PPS), and cycloolefin polymer (COP).

For example, JP 2014-009339 A discloses an active energy ray-curable adhesive composition for a plastic film or a sheet which includes a predetermined amount of urethane (meth) acrylate, an ethylenically unsaturated group-containing compound having a hydroxyl group in a molecule, ethylenically unsaturated group-containing compound whose glass transition temperature of a homopolymer is 50° C. or higher, and ethylenically unsaturated group-containing compound whose glass transition temperature of the homopolymer is 20° C. or lower.

SUMMARY

However, in the active energy ray-curable adhesive composition for a plastic film or a sheet disclosed in JP 2014-009339 A, it was difficult to bond various hardly adhesive materials in good balance.

The present invention was made considering the above circumstances, and an object thereof is to provide an adhesive composition which is excellent in adhesion to various hardly adhesive materials.

The main point of the present invention will now be described.

[1] An adhesive composition including the following components (A) to (C):
Component (A): (Meth) acrylic triblock elastomer having a weight average molecular weight of 80,000 or more,
Component (B): (Meth) acrylate monomer having no hydroxyl group and having a phenoxy group, and
Component (C): Radical initiator.

[2] The adhesive composition described in [1], in which the component (A) is an X—Y—X type (meth) acrylic triblock elastomer formed of a segment X having a glass transition temperature of 70° C. or higher and a segment Y having a glass transition temperature of 0° C. or lower.

[3] The adhesive composition described in [2], in which the segment X of the component (A) is a polymer of a methacrylate compound having an alkyl group of 1 to 3 carbon atoms, and the segment Y is a polymer of an acrylate compound having an alkyl group of 4 to 20 carbon atoms.

[4] The adhesive composition described in any one of [1] to [3], in which the component (A) has a melt flow index (190° C., 2.16 kg) of 20 or less.

[5] The adhesive composition described in any one of [2] to [4], in which a content ratio of segment X is 5 to 50% by mass when a total of the (meth) acrylic triblock elastomer of the component (A) is 100% by mass, and in the component (A), a content ratio of the segment Y is 50 to 95% by mass when a total of the (meth) acrylic triblock elastomer of the component (A) is 100% by mass.

[6] The adhesive composition described in any one of [1] to [5], in which the component (B) has one (meth) acryloyl group.

[7] The adhesive composition described in any one of [1] to [6], in which the component (B) is at least one selected from the group consisting of phenoxyethyl (meth) acrylate, phenoxy monoethylene glycol (meth) acrylate, phenoxy diethylene glycol (meth) acrylate, phenoxy triethylene glycol (meth) acrylate, phenoxy tetraethylene glycol (meth) acrylate, nonylphenoxy monoethylene glycol (meth) acrylate, nonylphenoxy diethylene glycol (meth) acrylate, nonylphenoxy triethylene glycol (meth) acrylate, and nonylphenoxy tetraethylene glycol (meth) acrylate.

[8] The adhesive composition described in any one of [1] to [7], in which 3 to 200 parts by mass of the component (A) is included with respect to 100 parts by mass of the component (B).

[9] The adhesive composition described in any one of [1] to [8], in which the component (C) is a photo radical initiator or an organic peroxide.

[10] The adhesive composition described in any one of [1] to [9], in which the adhesive composition is used for a hardly adhesive material.

[11] The adhesive composition described in [10], in which the hardly adhesive material is selected from the group consisting of polyethylene terephthalate, polyethylene, polypropylene, modified polyphenylene ether, polyphenylene sulfide, and a cycloolefin polymer.

[12] The adhesive composition according to any one of [1] to [11], in which the adhesive composition becomes a liquid state at 25° C.

[13] A cured product obtained by curing the adhesive composition described in any one of [1] to [9].

[14] A bonded body bonded by the adhesive composition described in any one of [1] to [9].

The present invention provides an adhesive composition that is excellent in adhesion to various hardly adhesive materials.

DETAILED DESCRIPTION

The present invention relates to an adhesive composition containing the following components (A) to (C): Component (A): (Meth) acrylic triblock elastomer having a weight average molecular weight of 80,000 or more, Component (B): (Meth) acrylate monomer having no hydroxyl group and having a phenoxy group, and Component (C): Radical initiator. With this configuration, the adhesive composition which is excellent in adhesion to various hardly adhesive materials is obtained.

The details of the invention will be described below.

<Component (A)>

Component (A) of the present invention is not particularly limited as long as it has a (meth) acrylic triblock elastomer having a weight average molecular weight of 80,000 or more. Among (meth) acrylic triblock elastomers, the component (A) employed in the present invention brings about a remarkable effect of being excellent in adhesion to specifically various hardly adhesive materials. The weight average molecular weight of the component (A) is preferably 85,000 or more and less than 1,000,000, more preferably 90,000 or more and less than 500,000, still more preferably 100,000 or more and less than 300,000, and still more preferably 105,000 or more and less than 150,000. By setting the weight average molecular weight of the component (A) to be in the range, the adhesion to the hardly adhesive material is further excellent. These may be used either alone or in combination of two or more. In the present specification, a (meth) acrylic triblock elastomer means a triblock elastomer obtained or obtainable by polymerizing a (meth) acrylic monomer.

In the present specification, the "weight average molecular weight" refers to a weight average molecular weight (Mw) in terms of polystyrene which is measured by gel permeation chromatography (GPC).

[GPC Measuring Device]
EcoSEC HLC-8320GPC manufactured by Tosoh Corporation

[GPC Measurement Condition]
GPC column: TSK gel SuperMultipore HZ-M
Flow rate: 0.35 ml/min
Injection amount: 40 um
Column temperature: 40° C.
System temperature: 40° C.
Eluent: tetrahydrofuran.

Examples of the component (A) include an X—Y—X type (meth) acrylic triblock elastomer formed of the segment X and the segment Y. A method of producing such an X—Y—X type (meth) acrylic triblock elastomer is not particularly limited, but may include a known method of living polymerizing (meth) acrylic monomers constituting each block. Examples of the living polymerization method include an anionic polymerization method using an organic alkali metal compound as a polymerization initiator, and a polymerization method using an organic rare earth metal complex as a polymerization initiator. In addition, it is possible to polymerize the well-known (meth) acrylic monomer which constitutes each block by using a polyvalent radical polymerization initiator or a polyvalent radical chain transfer agent.

The glass transition temperature of the segment X is preferably 70° C. or higher, more preferably 80° C. or higher, still more preferably 90° C. or higher, and still more preferably 100° C. or higher. When the segment X has such a lower limit glass transition temperature, the adhesion at the time of heat generation is excellent. The glass transition temperature of the segment X is preferably 250° C. or lower, more preferably 200° C. or lower, and still more preferably 150° C. or lower. When the segment X has such an upper limit glass transition temperature, the adhesion at the time of heat generation is excellent.

The glass transition temperature of the segment Y is preferably 0° C. or less, more preferably −10° C. or lower, still more preferably −15° C. or lower, still more preferably −20° C. or lower, still more preferably −25° C. or lower, still more preferably −30° C. or lower, still more preferably −35° C. or lower, still more preferably −40° C. or lower, and still more preferably −50° C. or lower. When the segment Y has such an upper limit glass transition temperature, peeling adhesion strength to the hardly adhesive material is further excellent.

The glass transition temperature of the segment Y is preferably −150° C. or higher, more preferably −100° C. or higher, and still more preferably −70° C. or higher. When the segment Y has such a lower limit glass transition temperature, peeling adhesion strength to the hardly adhesive material is further excellent.

According to the preferred aspect of the present invention, the component (A) is an X—Y—X type (meth) acrylic triblock elastomer formed of a segment X having a glass transition temperature of 70° C. or higher and a segment Y having a glass transition temperature of 0° C. or lower. By having the range mentioned above, the adhesion to the hardly adhesive material is further excellent. The glass transition temperature is a value derived from tan δ calculated using a dynamic viscoelasticity measurement (DMA) device.

The segment X of the component (A) is preferably a polymer of methacrylate having an alkyl group of 1 to 3 carbon atoms, and particularly preferably a polymer of methyl methacrylate (PMMA). With such an aspect, the adhesion to the hardly adhesive material is further excellent. In addition, the segment Y is preferably a polymer of an acrylate compound having an alkyl group of 1 to 20 carbon atoms, more preferably a polymer of an acrylate compound having an alkyl group of 2 to 15 carbon atoms, still more preferably a polymer of an acrylate compound having an alkyl group of 3 to 10 carbon atoms, still more preferably a polymer of an acrylate compound having an alkyl group of 4 to 8 carbon atoms, and still more preferably a polymer of an acrylate compound having an alkyl group of 4 to 6 carbon atoms. With such an aspect, the adhesion to the hardly adhesive material is further excellent. A polymer of n-butyl acrylate (PnBA) is particularly preferable.

According to the preferred aspect of the present invention, the segment X of the component (A) is a polymer of a methacrylate compound having an alkyl group of 1 to 3 carbon atoms, and the segment Y is a polymer of an acrylate compound having an alkyl group of 4 to 20 carbon atoms. According to the aspect, the adhesion to the hardly adhesive material is further excellent.

In the component (A), a content ratio of the segment X is preferably 5 to 50% by mass, more preferably 10 to 35% by mass, and still more preferably 15 to 28% by mass when the total of the (meth) acrylic triblock elastomer in the component (A) is 100% by mass. On the other hand, in the component (A), a content ratio of the segment Y is preferably 50 to 95% by mass, more preferably 65 to 90% by mass, and still more preferably 72 to 85% by mass when the total of the (meth) acrylic triblock elastomer in the component (A) is 100% by mass. By setting the weight average molecular weight of the component (A) to be in the range, the adhesion to the hardly adhesive material is further excellent.

According to the preferred embodiment of the present invention, the content ratio of the segment X is 5 to 50% by mass when the total of the (meth) acrylic triblock elastomer in the component (A) is 100% by mass, and the content ratio of the segment Y is 50 to 95% by mass when the total of the (meth) acrylic triblock elastomer in the component (A) is 100% by mass. By having the range mentioned above, the adhesion to the hardly adhesive material is further excellent.

According to the preferred embodiment of the present invention, a melt flow index (190° C., 2.16 kg) of the component (A) is 20 or less. According to the aspect, the adhesion to the hardly adhesive material is further excellent.

According to the preferred embodiment of the present invention, the melt flow index (190° C., 2.16 kg) of the component (A) is not particularly limited, but is more preferably 0.01 or more and 20 or less, still more preferably 0.02 or more and 10 or less, still more preferably 0.05 or more and 7 or less, still more preferably 0.1 or more and 7 or less, and still more preferably 1 or more and 5 or less. By having the range mentioned above, the adhesion to the hardly adhesive material is further excellent. The melt flow index is a value obtained according to ISO1133.

A commercially available product of the component (A) is not particularly limited, but examples thereof include Kuraray LA2330 manufactured by Kuraray Co., Ltd., and the like.

An added amount of the component (A) is not particularly limited, but the added amount of the component (A) is in the range of, for example, 3 to 200 parts by mass, more preferably 5 to 100 parts by mass, still more preferably 7 to 75 parts by mass, still more preferably 8 to 60 parts by mass, and still more preferably 9 to 50 parts by mass with respect to 100 parts by mass of the component (B) to be described later. By having the range mentioned above, the adhesion to the hardly adhesive material is further excellent. In the preferred embodiment of the present invention, if it is intended to further improve the peeling adhesion strength of PPE/PET, the added amount of the component (A) is preferably in the range of 3 to 35 parts by mass, more preferably 4 to 30 parts by mass, and still more preferably 5 to 25 parts by mass with respect to 100 parts by mass of the component (B). In the preferred embodiment of the present invention, if it is intended to further improve the peeling adhesion strength of PPS/PET, the added amount of the component (A) is preferably in the range of 15 to 75 parts by mass, more preferably 20 to 60 parts by mass, and still more preferably 30 to 50 parts by mass with respect to 100 parts by weight of the component (B).

The range of numerical values and the like disclosed in the present specification are not restricted by any purpose, and can be used as the basis for the amendment of the upper limit value and the lower limit value. In addition, it is considered that any combination of upper and lower limit values is disclosed in the specification without being limited by any purpose. For example, since it is regarded as disclosed in the present specification that "the added amount of the component (A) is 4 parts by mass or more with respect to 100 parts by mass of the component (B)" which is an example in which only the lower limit of the numerical range is selected, any amendment to be conducted is also appropriate, and it is regarded as disclosed in the present specification that since "the added amount of the component (A) is 4 parts by mass to 200 parts by mass with respect to 100 parts by mass of the component (B)" which is an example in which the upper limit value and the lower limit value are appropriately selected, any amendment to be conducted is also appropriate.

<Component (B)>

The component (B) of the present invention is not particularly limited as long as it is a (meth) acrylate monomer which does not have a hydroxyl group and has a phenoxy group. Among (meth) acrylate monomers which exist in plural, the component (B) employed in the present invention brings about a remarkable effect of being excellent in adhesion to specifically various hardly adhesive materials.

In the present specification, the (meth) acrylate monomer means a monomer having one or more (meth) acryloyl groups. Further, examples of the component (B) preferably include a compound having one (meth) acryloyl group because the compound can lower the viscosity of the adhesive composition before curing and easily dissolve the component (A). In addition, when the (meth) acrylate monomer which has a hydroxyl group is used instead of the component (B), adhesion to a hardly adhesive material is inferior, which is not preferable. Incidentally, using the (meth) acrylate monomer which has a hydroxyl group in combination with the component (B) is not limited.

The term "(meth) acryloyl group" means an acryloyl group or a methacryloyl group, but in the present invention, an acryloyl group is preferable from the viewpoint of being excellent in the adhesion to the hardly adhesive material.

The component (B) of the present invention may have an optional group (structure) in addition to the (meth) acryloyl group and the phenoxy group. As a result, the peeling adhesion strength to the hardly adhesive material is further excellent. As such a group (structure), an alkyl group, an alkylene glycol and the like are preferable. Such a group (structure) may be present between a (meth) acryloyl group and a phenoxy group, or may be present as a substituent of a phenoxy group. Both of these may be present. When the alkyl group is present between the (meth) acryloyl group and the phenoxy group, the number of carbon atoms of the alkyl group is preferably 1 to 10, more preferably 2 to 7, and still more preferably 2 to 5. When the alkyl group is present as a substituent of the phenoxy group, the number of carbon atoms of the alkyl group is preferably 1 to 30, and more preferably 2 to 25. Incidentally, the alkylene glycol is preferably present between the (meth) acryloyl group and the phenoxy group. As the alkylene glycol, ethylene glycol, diethylene glycol, triethylene glycol, propylene glycol, dipropylene glycol, tripropylene glycol, and the like are preferable.

The above component (B) is not particularly limited, but examples thereof include phenoxyethyl (meth) acrylate, phenoxy monoethylene glycol (meth) acrylate, phenoxydiethylene glycol (meth) acrylate, phenoxy triethylene glycol (meth) acrylate, phenoxy tetraethylene glycol (meth) acrylate, nonylphenoxy monoethylene glycol (meth) acrylate, nonylphenoxy diethylene glycol (meth) acrylate, nonylphenoxy triethylene glycol (meth) acrylate, nonylphenoxy tetraethylene glycol (meth) acrylate, and the like, and among those, preferably include phenoxyethyl (meth) acrylate, phenoxy monoethylene glycol (meth) acrylate, phenoxy diethylene glycol (meth) acrylate, nonylphenoxy monoethylene glycol (meth) acrylate, and nonylphenoxy diethylene glycol (meth) acrylate, and particularly preferably include phenoxyethyl (meth) acrylate, phenoxy monoethylene glycol (meth) acrylate, phenoxy diethylene glycol (meth) acrylate, nonylphenoxy monoethylene glycol (meth) acrylate, nonylphenoxy diethylene glycol (meth)acrylate, and the like. These may be used either alone, in only one or in combination of two or more.

<Component (C)>

The component (C) which can be used in the present invention is a radical initiator. Examples of the component (C) include a photo radical initiator, an organic peroxide or the like. A cured form of an adhesive composition of the present invention can be selected from photo curing, heat curing, or redox curing by the selection of the component (C) of the present invention. For example, when it is intended to impart the "photo-curable" to the adhesive composition, a photo radical initiator may be selected, and when it is intended to impart the "heat curing or curing by a redox reaction" to the adhesive composition, the organic peroxide may be selected.

A blending amount of the component (C) is not particularly limited, but it is preferable that 0.01 parts by mass or more and 10 parts by mass or less of the component (C) with respect to 100 parts by mass of the component (B) is added. When the amount of the component (C) is 0.01 parts by mass or more, curability is excellent, and when the amount of the component (C) is less than 10 parts by mass, preservation stability of the adhesive composition can be good. More preferably, 0.04 parts by mass or more and 8 parts by mass or less of the component (C) is added, and still more preferably 0.06 parts by mass or more and 6 parts by mass or less of the component (C) is added.

The photo radical initiator which is the component (C) used in the present invention is not be limited as long as it is a compound in which radical is generated by irradiating an active energy ray. Examples of the component (C) include an acetophenone-based photo radical initiator, a benzoin-based photo radical initiator, a benzophenone-based photo radical initiator, a thioxanthone-based photo radical initiator, an acyl phosphine oxide-based photo radical initiator, a titanocene-based photo radical initiator, and the like, and among those, preferably includes an acetophenone-based photo radical initiator and an acyl phosphine oxide-based photo radical initiator from the viewpoint of being excellent in photocurable property. In addition, these may be used either alone or in combination of two or more.

Examples of the acetophenone-based photo radical initiator include diethoxyacetophenone, 2-hydroxy-2-methyl-1-phenylpropan-1-one, benzyl dimethyl ketal, 4-(2-hydroxy-ethoxy) phenyl-(2-hydroxy-2-propyl) ketone, 1-hydroxy-cyclohexyl-phenyl-ketone, 2-methyl-2-morpholino (4-thiomethylphenyl) propan-1-one, 2-benzyl-2-dimethyl-amino-1-(4-morpholinophenyl) butanone, 2-hydroxy-2-methyl-1-[4-(1-methylvinyl) phenyl] propanone oligomer and the like, but are not limited thereto. Examples of commercially available products include IRGACURE (registered trademark) 184, DAROCUR (registered trademark) 1173 (manufactured by BASF Corporation), and the like.

Examples of the acyl phosphine oxide-based photo radical initiator include bis (2,4,6-trimethyl benzoyl)-phenyl phosphine oxide, 2,4,6-trimethyl benzoyl-diphenyl phosphine oxide and the like, but are not limited thereto.

The organic peroxide which is the component (C) used in the present invention is a compound in which radical species are generated by heating at 50° C. or higher or the redox reaction. It is preferable to use the redox reaction because the radical species can be generated at room temperature. The component (C) is not particularly limited, but examples thereof include, ketone peroxide compounds such as methyl ethyl ketone peroxide, cyclohexanone peroxide, 3,3,5-trimethyl cyclohexanone peroxide, methylcyclohexanone peroxide, methylacetoacetate peroxide, and acetylacetone peroxide; peroxyketal compounds such as 1,1-bis (t-butylperoxy)-3,3,5-trimethylcyclohexane, 1,1-bis (t-butylperoxy) cyclohexane, 2,2-bis (t-butylperoxy) octane, n-butyl-4,4-bis (t-butylperoxy) valerate, and 2,2-bis (t-butylperoxy) butane; hydroperoxide compounds such as t-butyl hydroperoxide, cumene hydroperoxide, diisopropylbenzene hydroperoxide, p-menthane hydroperoxide, 2,5-dimethylhexane-2,5-dihydroperoxide, and 1,1,3,3-tetramethylbutyl hydroperoxide; dialkyl peroxide compounds such as di-t-butyl peroxide, t-butylcumyl peroxide, dicumyl peroxide, α,α'-bis (t-butylperoxy-m-isopropyl) benzene, 2,5-dimethyl-2,5-di (t-butylperoxy) hexane, and 2,5-dimethyl-2,5-di (t-butylperoxy) hexyne-3; diacyl peroxide compounds such as acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichloro peroxide benzoyl peroxide, and m-toluoyl peroxide; peroxy dicarbonate compounds such as diisopropyl peroxy dicarbonate, di-2-ethylhexyl peroxy dicarbonate, di n-propyl peroxy dicarbonate, bis-(4-t-butylcyclohexyl) peroxy dicarbonate, dimyristyl peroxy dicarbonate, di-2-ethoxy ethylperoxydicarbonate, dimethoxyisopropylperoxydicarbonate, di (3-methyl-3-methoxybutyl) peroxydicarbonate, and diallylperoxydicarbonate; peroxyester compounds such as t-butyl peroxy acetate, t-butyl peroxy isobutyrate, t-butyl peroxy pivalate, t-butyl peroxyneodecanoate, cumyl peroxyneodecanoate, t-butyl-2-ethylperoxy hexanoate, t-butyl peroxy-3,5,5-trimethylhexanoate, t-butyl peroxylaurate, t-butyl peroxybenzoate, di-t-butyl peroxyisophthalate, 2,5-dimethyl-2,5-di (benzoylperoxy) hexane, t-butylperoxymaleic acid, t-butylperoxyisopropylcarbonate, cumylperoxy octoate, t-hexyl peroxyneodecanoate, t-hexyl peroxypivalate, t-butyl peroxyneohexanoate, t-hexyl peroxyneohexanoate, and cumyl peroxyneohexanoate; and acetyl cyclohexyl sulfonyl peroxide, t-butyl peroxy allyl carbonate, and the like. These organic peroxides may be used either alone or in combination of two or more. Among those, the dialkyl peroxide compounds, the peroxy dicarbonate compounds, and the peroxy ester compounds are preferably used from the viewpoint of the curability. In addition, examples of the organic peroxide suitable for the redox reaction include the dialkyl peroxide compound.

When the organic peroxide is used as the component (C), a curing accelerator can be blended for the purpose of accelerating the redox reaction. Such a curing accelerator is not particularly limited, but preferably, saccharin (o-benzoic sulfimide), a hydrazine-based compound, an amine compound, a mercaptan compound, a metal organic compound and the like are used. The curing accelerator may be used either alone or in combinations of two or more. It is more preferable to use the combinations since the curing accelerating effect is good.

Examples of the hydrazine-based compound include 1-acetyl-2-phenylhydrazine, 1-acetyl-2-(p-tolyl) hydrazine, 1-benzoyl-2-phenylhydrazine, 1-(1',1',1'-trifluoro) acetyl-2-phenyl hydrazine, 1,5-diphenyl-carbohydrazine, 1-formyl-2-phenylhydrazine, 1-acetyl-2-(p-bromophenyl) hydrazine, 1-acetyl-2-(p-nitrophenyl) hydrazine, 1-acetyl-2-(2'-phenylethylhydrazine), ethyl carbazate, p-nitrophenylhydrazine, p-trisulfonyl hydrazide, and the like.

Examples of the amine compound include heterocyclic secondary amines such as 2-ethylhexylamine, 1,2,3,4-tetrahydroquinone, and 1,2,3,4-tetrahydroquinaldine; heterocyclic tertiary amines such as quinoline, methyl quinoline, quinaldine, and quinoxaline phenazine; aromatic tertiary amines such as N,N-dimethyl-para-toluidine, N,N-dimethylanisidine, and N,N-dimethylaniline; azole-based compounds such as 1,2,4-triazole, oxazole, oxadiazole, thiadiazole, benzothiazole, hydroxybenzotriazole, benzoxazole, 1,2,3-benzothiadiazole, and 3-mercaptobenzotriazole, and the like.

Examples of the mercaptan compound include n-dodecyl mercaptan, ethyl mercaptan, butyl mercaptan, tris-[(3-mercaptopropionyloxy)-ethyl]-isocyanurate, pentaerythritol tetrakis (3-mercaptopropionate), dipentaerythritol hexakis (3-mercaptopropionate), trimethylolpropane tris (3-mercaptopropionate), trimethylolpropane tristhioglycollate, pentaerythritol tetrakisthioglycollate, and the like.

Examples of the metal organic compound include pentadione iron, pentadione cobalt, cobalt neodecanoate, pentadione copper, propylene diamine copper, ethylene diamine copper, neodecanoate copper, iron naphthenate, nickel naphthenate, cobalt naphthenate, copper naphthenate, copper octoate, iron hexoate, iron propionate, acetylacetone vanadium, and the like.

The adhesive composition of the present invention can be used as a one-pack composition, but can also be used as a two-pack composition. When the adhesive composition is the two-pack composition, it is preferable that one solution contains a radical polymerization initiator of the component (C) and the other liquid contains a metal organic compound.

As described above, by separating the radical polymerization initiator and the metal organic compound of the component (C) into separate liquids, it is possible to suppress unnecessary reactions during storage and enhance storage stability. The two liquids can be mixed during use or applied separately, and then contacted and cured. Here, components other than the radical polymerization initiator and the metal organic compound of the component (C) can be divided at an arbitrary ratio and also included in any liquid.

<Optional Component>

Additives such as a compound having a (meth) acryloyl group other than the component (B) of the present invention, an adhesion promoter such as a silane coupling agent, a filler, an adhesion imparting agent such as a tackifier, thermoplastic elastomer, rubber-like polymer fine particles, storage stabilizer such as BHT, an antioxidant, a light stabilizer, a plasticizer, dye, pigment, a flame retardant, a sensitizer, an organic solvent, a heavy metal deactivator, an ion trap agent, an emulsifier, a water dispersion stabilizer, an antifoam agent, a mold release agent, a leveling agent, wax, a rheology control agent, a surfactant, and the like may be blended in an appropriate amount as long as the object of the present invention is not impaired.

As the compound having a (meth) acryloyl group other than the component (B) of the present invention, for example, monomers of monofunctional, difunctional, trifunctional, and polyfunctional monomers, oligomers, and the like can be used. These can be used alone or as a mixture of two or more. In addition, the blending amount of the compound having a (meth) acryloyl group is not particularly limited, but is preferably 0.1 to 300 parts by mass with respect to 100 parts by mass of the component (B).

Examples of the monofunctional monomer include lauryl (meth) acrylate, stearyl (meth) acrylate, tetrahydrofurfuryl (meth) acrylate, caprolactone modified tetrahydrofurfuryl (meth) acrylate, cyclohexyl (meth) acrylate, butoxyethyl (meth) acrylate, 2-hydroxyethyl (meth) acrylate, 2-hydroxypropyl (meth) acrylate, 4-hydroxybutyl (meth) acrylate, glycerol (meth) acrylate, modified butyl (meth) acrylate, N,N-dimethylaminoethyl (meth) acrylate, N,N-diethylamino ethyl (meth) acrylate, and the like, and are preferably cyclohexyl (meth) acrylate, 2-hydroxyethyl (meth) acrylate, 2-hydroxypropyl (meth) acrylate, and 4-hydroxybutyl (meth) acrylate from the viewpoint of excellent compatibility between the components (A) and (B) of the present invention.

Examples of the difunctional monomer include neopentyl glycol di (meth) acrylate, stearic acid modified pentaerythritol di (meth) acrylate, dicyclopentenyl diacrylate, di (meth) acryloyl isocyanurate, alkylene oxide modified bisphenol di (meth) acrylate, epoxy (meth) acrylate, and the like.

Examples of the trifunctional monomer include trimethylolpropane tri (meth) acrylate, pentaerythritol tri (meth) acrylate, tris (acryloyloxyethyl) isocyanurate, and the like.

Examples of the polyfunctional monomer include ditrimethylolpropane tetra (meth) acrylate, pentaerythritol tetra (meth) acrylate, dipentaerythritol monohydroxy penta (meth) acrylate, alkyl modified dipentaerythritol pentaacrylate, dipentaerythritol hexa (meth) acrylate, and the like. These polymerizable monomers can be used alone or as a mixture of two or more.

Examples of the oligomer include urethane (meth) acrylate of a polybutadiene skeleton, urethane (meth) acrylate of a hydrogenated polybutadiene skeleton, urethane (meth) acrylate of a polycarbonate skeleton, urethane (meth) acrylate of a polyether skeleton, urethane (meth) acrylate of a polyester skeleton, urethane (meth) acrylate of castor oil skeleton, isoprene-based (meth) acrylate, hydrogenated isoprene-based (meth) acrylate, and the like.

Examples of the silane coupling agent include glycidyl group-containing silane coupling agents such as 3-glycidoxypropylmethyldimethoxysilane, 3-glycidoxypropylmethyldiethoxysilane, 3-glycidoxypropylmethyldipropyloxysilane, 3-glycidoxypropyldimethylmonomethoxysilane, 3-glycidoxypropyl dimethylmonoethoxysilane, 3-glycidoxypropyldimethylmonopropyloxysilane, 2-(3,4-epoxycyclohexyl) ethyltrimethoxysilane, 3-glycidoxypropyltriethoxysilane, 3-glycidoxypropyltrimethoxysilane, and 3-glycidoxypropylmethyldiethoxysilane, vinyl group-containing silane coupling agents such as vinyltris (β-methoxyethoxy) silane, vinyltriethoxysilane, and vinyltrimethoxysilane, (meth) acrylic group-containing silane coupling agents such as 3-methacryloxypropylmethyldimethoxysilane, 3-methacryloxypropylmethyldiethoxysilane, 3-methacryloxypropyldimethylmonomethoxysilane, 3-methacryloxypropyldimethylmonoethoxysilane, 3-acryloxypropylmethyldipropyloxysilane, 3-acryloxypropylmethyldimethoxysilane, 3-acryloxypropylmethyldiethoxysilane, 3-acryloxypropylmethyldipropyloxysilane, 3-acryloxypropyldimethylmonopropyloxysilane, 3-acryloxypropyldimethylmonomethoxysilane, 3-acryloxypropyldimethylmonoethoxysilane, 3-acryloxypropyldimethylmonopropyloxysilane, and γ-methacryloxypropyltrimethoxysilane, amino group-containing silane coupling agents such as N-β-(aminoethyl)-γ-aminopropyltrimethoxysilane, γ-aminopropyltriethoxysilane, and N-phenyl-γ-aminopropyltrimethoxysilane, other γ-mercaptopropyltrimethoxysilane, γ-chloropropyltrimethoxysilane, and the like.

Among those, the glycidyl group-containing silane coupling agents, the vinyl group-containing silane coupling agents, and the (meth) acrylic group-containing silane coupling agents are preferred from the viewpoint of excellent adhesion. These may be used either alone or in combination of two or more. In addition, the blending amount of the silane coupling agent is preferably 0.1 to 20 parts by mass with respect to 100 parts by mass of the component (B) of the present invention.

Examples of the filler include glass, silica, alumina, talc, mica, silicone rubber powder, calcium carbonate, aluminum nitride, carbon powder, kaolin clay, dried clay mineral, dried diatomaceous earth, and the like.

An average particle diameter of the filler is preferably 0.001 to 100 μm, more preferably 0.01 to 50 μm, and particularly preferably 0.1 to 20 μm. It is to be noted that a method of measuring an average particle diameter is a laser diffraction method. The blending amount of the filler is not particularly limited, but is preferably 0.1 to 300 parts by mass, more preferably 1 to 200 parts by mass, particularly preferably 5 to 100 parts by mass with respect to 100 parts by mass of the component (B).

The silica-based filler is blended in order to improve the mechanical strength of the cured product. Preferably, such as those subjected to hydrophobization treatment with dimethyldichlorosilane, hexamethyl silazane, silicone oil, aminosilane, alkylsilane having 1 to 12 carbon atoms, silane having a (meth) acryloyl group and the like are used. Examples of the commercially available product of silica include Aerosil R974, R972, R9200, R976, R976S, RX50, NAX50, NX90, RX200, R8200, RX300, R812, R812S, RY50, NY50, RY200S, R202, RY200, RY300, R104, R106, RA200H, RA200HS, R805, R816, RM50, R711, R7200 (manufactured by Nippon Aerosil), and the like.

Among the optional components, it is preferable to add the antioxidant and the light stabilizer in order to improve the weather resistance of the adhesive composition. Commercially available products can be used as the antioxidant and the light stabilizer. Examples of the commercially available product include Sumilizer (registered trademark) BHT, Sumilizer (registered trademark) S, Sumilizer (registered trademark) BP-76, Sumilizer (registered trademark) MDP-S, Sumilizer (registered trademark) GM, Sumilizer (registered trademark) BBM-S, Sumilizer (registered trademark) WX-R, Sumilizer (registered trademark)-NW, Sumilizer (registered trademark) BP-179, Sumilizer (registered trademark) BP-101, Sumilizer (registered trademark) GA-80, Sumilizer (registered trademark) TNP, Sumilizer (registered trademark) TPP-R, Sumilizer (registered trademark) P-16 (manufactured by Sumitomo Chemical Co., Ltd.), Adekastab (registered trademark) AO-20, Adekastab (registered trademark) AO-30, Adekastab (registered trademark) AO-40, Adekastab (registered trademark) AO-50, Adekastab (registered trademark) AO-60, Adekastab (registered trademark) AO-70, Adekastab (registered trademark) AO-80, Adekastab (registered trademark) AO-330, Adekastab (registered trademark) PEP-4C, Adekastab (registered trademark) PEP-8, Adekastab (registered trademark) PEP-24G, Adekastab (registered trademark) PEP-36, Adekastab (registered trademark) HP-10, Adekastab (registered trademark) 2112, Adekastab (registered trademark) 260, Adekastab (registered trademark) 522A, Adekastab (registered trademark) 329K, Adekastab (registered trademark) 1500, Adekastab (registered trademark) C, Adekastab (registered trademark) 135A, Adekastab (registered trademark) 3010 (manufactured by Asahi Denka Kogyo Co., Ltd.), Tinuvin (registered trademark) 770, Tinuvin (registered trademark) 765, Tinuvin (registered trademark) 144, Tinuvin (registered trademark) 622, Tinuvin (registered trademark) 111, Tinuvin (registered trademark) 123, Tinuvin (registered trademark) 292 (manufactured by Ciba Specialty Chemicals Inc. (BASF Corporation))) and the like. The blending amount of these antioxidants and light stabilizers is not particularly limited, but is preferably 0.001 to 10 parts by mass, more preferably 0.01 to 5 parts by mass with respect to 100 parts by mass of the component (B).

<Production Method>

The adhesive composition of the present invention can be produced by the conventionally known method. For example, the adhesive composition can be produced by blending a predetermined amount of the components (A) to (C) and mixing these components at a temperature of preferably 10 to 70° C. preferably for 0.1 to 5 hours by using mixing means such as a mixer. In addition, it is preferable that the adhesive composition is produced under the light-shielding environment.

<Coating Method>

As a method of applying an adhesive composition of the present invention to an adherend, the known sealing agent or adhesive method may be used. For example, methods such as dispensing using an automatic coater, spraying, inkjet, screen printing, gravure printing, dipping, spin coating, and the like can be used. The adhesive composition of the present invention is preferably a liquid state at 25° C. from the viewpoint of coating properties. Here, the "liquid state at 25° C." indicates a viscosity of 0.01 to 1000 Pa·s with a cone-plate viscometer at 25° C.

<Curing Method and Cured Product>

A cured form of an adhesive composition of the present invention can be selected from photo curing, heat curing, or redox curing by the selection of the component (C) of the present invention. For example, when it is intended to impart the "photo-curable" to the adhesive composition, a photo radical initiator may be selected, and when it is intended to impart the "heat curing or curing by a redox reaction" to the adhesive composition, the organic peroxide may be selected.

Regarding the curing conditions in the case where the photocurable property is imparted to the adhesive composition of the present invention, a light source used at the time of curing the adhesive composition of the present invention by irradiating light such as ultraviolet light and visible light is not particularly limited, and examples of the light source include a low pressure mercury lamp, a medium pressure mercury lamp, a high pressure mercury lamp, a super high pressure mercury lamp, a black light lamp, a microwave excitation mercury lamp, a metal halide lamp, a sodium lamp, a halogen lamp, a xenon lamp, LED, a fluorescent lamp, sunlight, electron beam irradiation device, and the like. An irradiation dose of the light irradiation is preferably 10 kJ/m$^2$ or more and more preferably 15 kJ/m$^2$ or more, from the viewpoint of the properties of the cured product. The upper limit is not particularly limited, but for example, is 1000 kJ/m$^2$ or less.

In addition, the curing conditions in the case of imparting heat curing property in the adhesive composition of the present invention are not particularly limited, but examples thereof are that a temperature of 45° C. or higher and lower than 200° C. is preferable and more preferably 50° C. or higher or lower than 150° C. The curing time is not particularly limited, but in the case of a temperature of 45° C. or higher and lower than 200° C., 3 minutes or more and less than 5 hours are preferable, and 10 minutes or more and less than 3 hours are more preferable. The cured product obtained by curing the adhesive composition of the present invention is also part of the embodiment of the present invention. The bonded body bonded by the adhesive composition of the present invention is also a part of the embodiment of the present invention.

<USE>

The adhesive composition of the present invention is used as an adhesive composition for a hardly adhesive material since adhesion to hardly adhesive materials such as polyethylene terephthalate (PET), polyethylene (PE), polypropylene (PP), modified polyphenylene ether (PPE), polyphenylene sulfide (PPS), cycloolefin polymer (COP), and the like is excellent. Thus, according to the preferred aspect of the invention, the hardly adhesive material is selected from the group consisting of polyethylene terephthalate, polyethylene, polypropylene, modified polyphenylene ether, polyphenylene sulfide, and a cycloolefin polymer.

As specific use, the adhesive composition of the present invention can be used for bonding and the like of switch parts for automobiles, a headlamp, engine internal components, electrical components, a drive engine, a brake oil tank, a front hood, a fender, a body panel such as a door, a window, and the like, in the field of automobiles and transportation machines; bonding and the like of a liquid crystal display, organic electroluminescence, a light emitting diode display, a field emission display, in a flat panel display; used for bonding and the like of a video disk, CD, DVD, MD, a pickup lens, hard disk peripherals (members for spindle motors, members for magnetic head actuators, and the like), a Blu-ray disk, and the like in a recording field; used as sealing materials such as electronic components, electrical circuits, electrical contacts or semiconductor elements, a die bonding agent, a conductive adhesive, an anisotropic conductive adhesive, an interlayer adhesive of a multilayer substrate including a buildup substrate, a solder resist, and the like, in the field of electronic materials; used for bonding and the like of a lithium battery, a manganese battery, an alkaline battery, a nickel battery, a fuel cell, a silicon solar cell, a dye-sensitized solar cell, an organic solar cell, and the like, in the field of batteries; used as an adhesive and the like for optical switch peripherals in an optical communication system, an optical fiber material around an optical connector, optical passive components, optical circuit components, optoelectronic integrated circuit peripherals, and the like, in the field of optical components; used as an adhesive and the like for a camera module, a material for a steel camera lens, a finder prism, a target prism, a finder cover, a light receiving sensor unit, a photographing lens, a projection lens for a projection television, and the like, in the field of optical instruments; used for bonding of a gas pipe, a water pipe and the like, and used as a lining agent, sealing, casting, molding, a coating material, and the like, in the infrastructure field.

Examples of the resin used in the automotive and transport field include polypropylene (PP), polyethylene (PE), polyurethane, ABS, a phenol resin, carbon fiber reinforced plastic (CFRP), glass fiber reinforced plastic (GFRP), and the like. In particular, the carbon fiber reinforced plastic (CFRP) and the glass fiber reinforced plastic (GFRP) are used for a vehicle body. In addition, a frame of an electrolyte membrane of the fuel cell is made of hardly adhesive materials such as PP and PEN. In addition, examples of bonding portions of the camera module include a portion between image sensors such as CMOS and CCD and a substrate, a portion between a cut filter and the substrate, a portion between the substrate and a housing, a portion between the housing and the cut filter, a portion between the housing and a lens unit, and the like.

The material of the housing or the lens unit is made of hardly adhesive materials such as a liquid crystal polymer (LCP), polyphenylene sulfide (PPS), and polycarbonate.

EXAMPLES

Hereinafter, the present invention will be described in more detail with reference to examples, but the present invention is not limited to these examples. Further, in the following examples, unless otherwise stated, the operation was performed under the conditions of room temperature (25° C.)/relative humidity of 40 to 50% RH.
<Preparation of Adhesive Composition>

Example 1

A adhesive composition of Example 1 which is in a liquid state at 25° C. was obtained by adding, as component (A), 10 parts by mass of PMMA-PnBA-PMMA triblock polymer (Kuraray LA2330 manufactured by Kuraray Co., Ltd.) (a1) whose weight average molecular weight is 110,000 and which contains 22% by mass of PMMA (glass transition temperature of 105° C.) having a melt flow index (190° C., 2.16 kg) of 3.7 and 78% by mass of PnBA (glass transition temperature −54° C.), as component (B), 100 parts by mass of phenoxyethyl acrylate (biscoat #192 manufactured by Osaka Organic Chemical Industry Co., Ltd.) (b1), and as component (C), 3 parts by mass of 1-hydroxy-cyclohexyl-phenyl-ketone (c1) as a photo radical initiator and mixing the added components by a mixer at 25° C. under light shielding environment for 60 minutes.

Example 2

An adhesive composition of Example 2 which is in a liquid state at 25° C. was obtained by being prepared in the same manner as in Example 1 except that the component (a1) is changed from 10 parts by mass to 40 parts by mass in Example 1.

Example 3

An adhesive composition of Example 3 which is in a liquid state at 25° C. was obtained by being prepared in the same manner as in Example 1 except that 3 parts by mass of the component (c1) is changed to 0.1 parts by mass of t-butyl-2-ethylperoxyhexanoate (c2) which is an organic peroxide, in Example 1.

Comparative Example 1

A adhesive composition of Comparative Example 1 which is in a liquid state at 25° C. was obtained by being prepared in the same manner as Example 1 except that the component (a1) is changed to a PMMA-PnBA-PMMA triblock polymer (Kuraray LA2140e manufactured by Kuraray Co., Ltd.) (a'1) whose weight average molecular weight is 70,000 and which contains 22% by mass of PMMA (glass transition temperature of 105° C.) having a melt flow index (190° C., 2.16 kg) of 31 and 78% by mass of PnBA (glass transition temperature −54° C.), in Example 1.

Comparative Example 2

A adhesive composition of Comparative Example 2 which is in a liquid state at 25° C. was obtained by being prepared in the same manner as Example 1 except that the component (a1) is changed to a PMMA-PnBA-PMMA triblock polymer (Kuraray LA2250 manufactured by Kuraray Co., Ltd.) (a'2) whose weight average molecular weight is 60,000 and which contains 41% by mass of PMMA (glass transition temperature of 105° C.) having a melt flow index (190° C., 2.16 kg) of 25 and 59% by mass of PnBA (glass transition temperature −54° C.), in Example 1.

Comparative Example 3

An adhesive composition of Comparative Example 3 which is in a liquid state at 25° C. was obtained by being prepared in the same manner as in Example 1 except that the component (a1) is changed to PMMA (Macromonomer AA-6 manufactured by Toho Gosei Co., Ltd.) (a'3) containing a methacryloyl group having a weight average molecular weight of 6,000, in Example 1.

Comparative Example 4

An adhesive composition of Comparative Example 4 which is in a liquid state at 25° C. was obtained by being prepared in the same manner as in Example 1 except that the component (b1) is changed to isobornyl acrylate (b'1), in Example 1.

Comparative Example 5

An adhesive composition of Comparative Example 5 which is in a liquid state at 25° C. was obtained by being prepared in the same manner as in Example 1 except that the component (b1) is changed to dicyclopentenyloxyethyl acrylate (b'2), in Example 1.

Comparative Example 6

An adhesive composition of Comparative Example 6 which is in a liquid state at 25° C. was obtained by being prepared in the same manner as in Example 1 except that the component (b1) is changed to hydroxyethyl methacrylate (b'3), in Example 1.

Comparative Example 7

An adhesive composition of Comparative Example 7 which is in a liquid state at 25° C. was obtained by being prepared in the same manner as in Example 1 except that the component (b1) is changed to isooctyl acrylate (b'4), in Example 1.

Comparative Example 8

An adhesive composition of Comparative Example 8 which is in a liquid state at 25° C. was obtained by being prepared in the same manner as in Comparative Example 5 except that 3 parts by mass of the component (c1) is changed to 0.1 parts by mass of t-butyl-2-ethylperoxyhexanoate (c2) which is an organic peroxide, in Comparative Example 5.

The test methods used in Examples and Comparative Examples in Table 1 are as follows.

<Preparation of Test Piece>

Preparation of Test Piece (1)

The photocurable adhesive compositions of Examples 1 and 2 and Comparative Examples 1 to 7 were each coated to the first adherend (made of transparent PET film subjected to easy adhesion surface treatment) so as to be a thickness of 50 μm using a glass rod.

Next, the second adherend (any one of a transparent PET film subjected to easy adhesion surface treatment, modified polyphenylene ether (PPE), polyphenylene sulfide (PPS)) was bonded to have a bonding area of 5 mm×80 mm, and cured by being irradiated with ultraviolet rays having an integrated light amount of 30 kJ/m$^2$ to obtain a test piece.

Preparation of Test Piece (2)

The photocurable adhesive compositions of Example 3 and Comparative Example 8 were each coated to the first adherend (made of transparent PET film subjected to easy adhesion surface treatment) so as to be a thickness of 50 μm using a glass rod.

Next, the second adherend (any one of a transparent PET film subjected to easy adhesion surface treatment, modified polyphenylene ether (PPE), polyphenylene sulfide (PPS)) was bonded to have a bonding area of 5 mm×80 mm, and then cured by being heated at 100° C. for 1 hour to obtain a test piece.

<Peeling Adhesion Strength Test>

A peeling adhesion strength "N/m" was measured in a test speed of 300 mm/minutes according to JIS K 6854-2 (1999) (adhesive-peeling adhesion strength test method part 2: 180 degree peeling method) by using the respective test pieces (1) and (2).

[Evaluation Criteria]

The PET/PET peeling adhesion strength is preferably 5.0 N/m or more.

The PPE/PET peeling adhesion strength is preferably 15.0 N/m or more.

PPS/PET peeling adhesion strength is preferably 14.0 N/m or more.

TABLE 1

|  | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|
| PET/PET Peeling Adhesion strength | 8.0 | 8.0 | 8.0 | 7.9 | 8.1 | 0.1 | ND | 0.1 | 0.1 | ND | 0.1 |
| PPE/PET Peeling Adhesion strength | 17.9 | 17.0 | 16.9 | 13.2 | 12.8 | 1.1 | 0.1 | 0.1 | 0.3 | ND | — |
| PPS/PET Peeling Adhesion strength | 15.7 | 16.3 | 15.1 | 13.0 | 9.8 | 1.7 | 0.1 | 0.4 | 0.3 | ND | — |

ND: Below measurement limit
—: Not measured

It can be seen from Table 1 that Examples 1 to 3 are excellent in adhesion to various hardly adhesive materials such as PET, PPE, and PPS. On the other hand, Comparative Examples 1 to 3 are adhesive compositions using an acrylic elastomer which is not the component (A) that is the feature of the present invention, but it is understood that the adhesion to PPE and PPS is inferior. Further, Comparative Examples 4 to 8 are adhesive compositions using a (meth) acrylate monomer which is not present in the component (B) which is a features of the preset invention, but it was understood that adhesion to various hardly adhesive materials such as PET, PPE, and PPS is inferior.

The present application is based on Japanese Patent Application No. 2018-134826 filed on Jul. 18, 2018, the disclosure of which is incorporated by reference in its entirety.

The present invention is industrially useful because it can be used and effective for various adhesive applications due to excellent adhesion to various hardly adhesive materials.

What is claimed is:

1. An adhesive composition comprising the following components (A) to (C):
   component (A): (Meth) acrylic triblock elastomer having a melt flow index (190° C., 2.16 kg) of 0.01 or more and 20 or less and having a weight average molecular weight of 80,000 or more,
   component (B): (Meth) acrylate monomer having no hydroxyl group and having a phenoxy group, and
   component (C): Radical initiator,
   wherein the component (A) is an X—Y—X type (meth) acrylic triblock elastomer formed of a segment X which is a polymer of a (meth)acrylate compound and a segment Y which is a polymer of a (meth)acrylate compound, wherein the component (B) consists of phenoxyethyl acrylate.

2. The adhesive composition according to claim 1, wherein component (A) is an X—Y—X type (meth) acrylic triblock elastomer formed of a segment X having a glass transition temperature of 70° C. or higher and a segment Y having a glass transition temperature of 0° C. or lower.

3. The adhesive composition according to claim 2, wherein segment X of component (A) is a polymer of a methacrylate compound having an alkyl group of 1 to 3 carbon atoms, and the segment Y is a polymer of an acrylate compound having an alkyl group of 4 to 20 carbon atoms.

4. The adhesive composition according to claim 2, wherein a content ratio of segment X is 5 to 50% by mass when a total of the (meth) acrylic triblock elastomer of the component (A) is 100% by mass, and in the component (A), a content ratio of the segment Y is 50 to 95% by mass when a total of the (meth) acrylic triblock elastomer of the component (A) is 100% by mass.

5. The adhesive composition according to claim 1, wherein 3 to 200 parts by mass of component (A) is included with respect to 100 parts by mass of component (B).

6. The adhesive composition according to claim 1, wherein component (C) is a photo radical initiator or an organic peroxide.

7. The adhesive composition according to claim 1, wherein the adhesive composition is used for bonding a material being selected from the group consisting of polyethylene terephthalate, polyethylene, polypropylene, modified polyphenylene ether, polyphenylene sulfide, and a cycloolefin polymer.

8. The adhesive composition according to claim 1, wherein the adhesive composition is in a liquid state at 25° C.

9. The adhesive composition according to claim 1, wherein the component (C) is consisting of an organic peroxide.

10. The adhesive composition according to claim 1, wherein 3 to 7 parts by mass of the component (A) is included with respect to 100 parts by mass of the component (B), and 0.01 to 3 parts by mass of the component (C) is included with respect to 100 parts by mass of the component (B).

11. An adhesive composition comprising the following components (A) to (C):

component (A): (Meth) acrylic triblock elastomer having a melt flow index (190° C., 2.16 kg) of 0.01 or more and 20 or less and having a weight average molecular weight of 80,000 or more, component (B): (Meth) acrylate monomer having no hydroxyl group and having a phenoxy group, and component (C): Radical initiator, wherein the component (A) is an X—Y—X type (meth) acrylic triblock elastomer formed of a segment X which is a polymer of a (meth)acrylate compound and a segment Y which is a polymer of a (meth)acrylate compound;

wherein the adhesive composition has a PPE peel adhesion strength of 15.0 N/m or more, and wherein the adhesive composition has a PPS peel adhesion strength of 14.0 N/m or more.

12. A cured product obtained by curing the adhesive composition according to claim 1.

13. A bonded body bonded by the adhesive composition according to claim 1.

* * * * *